Nov. 11, 1969  D. PFEFFER  3,477,707
JEWELER'S VISE
Filed Dec. 6, 1967  2 Sheets-Sheet 1
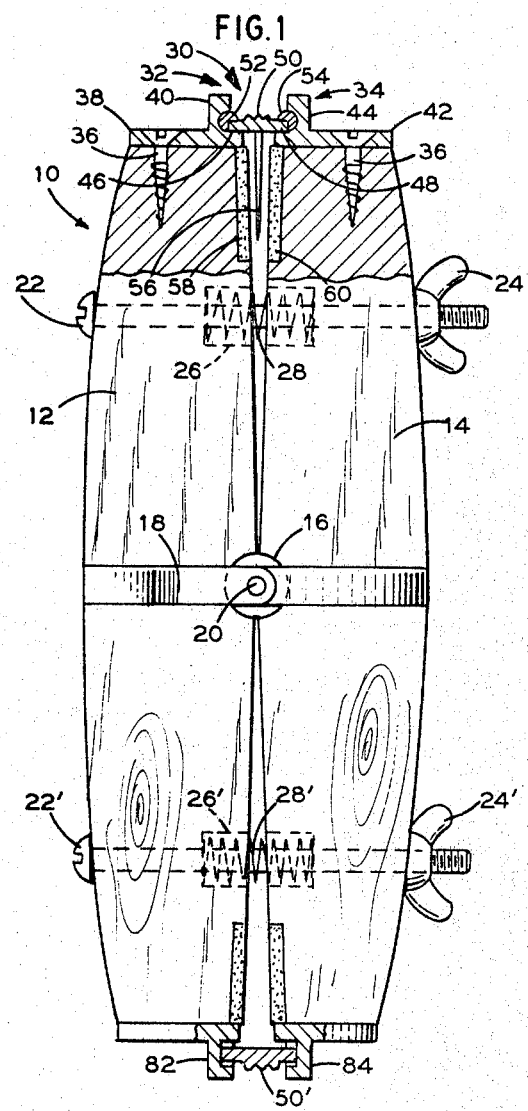
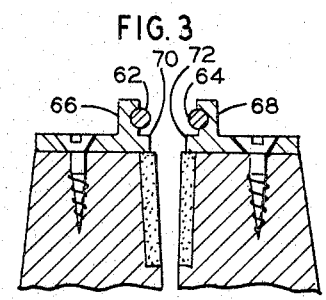
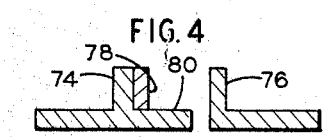
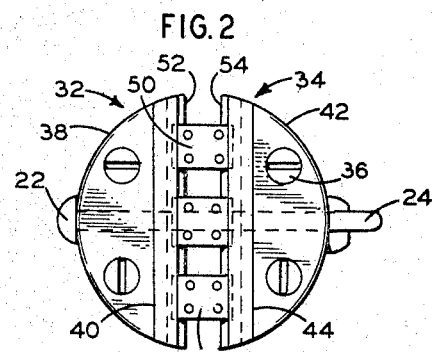
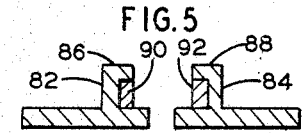
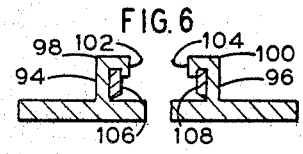
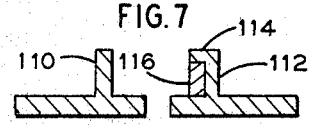
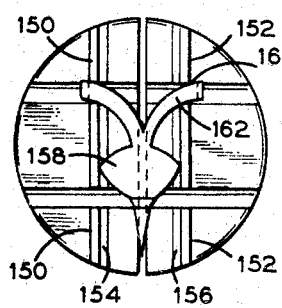
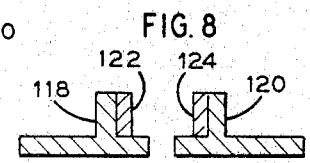
INVENTOR
David Pfeffer
BY Irving Seidman
ATTORNEY Nov. 11, 1969    D. PFEFFER    3,477,707
JEWELER'S VISE
Filed Dec. 6, 1967    2 Sheets-Sheet 2
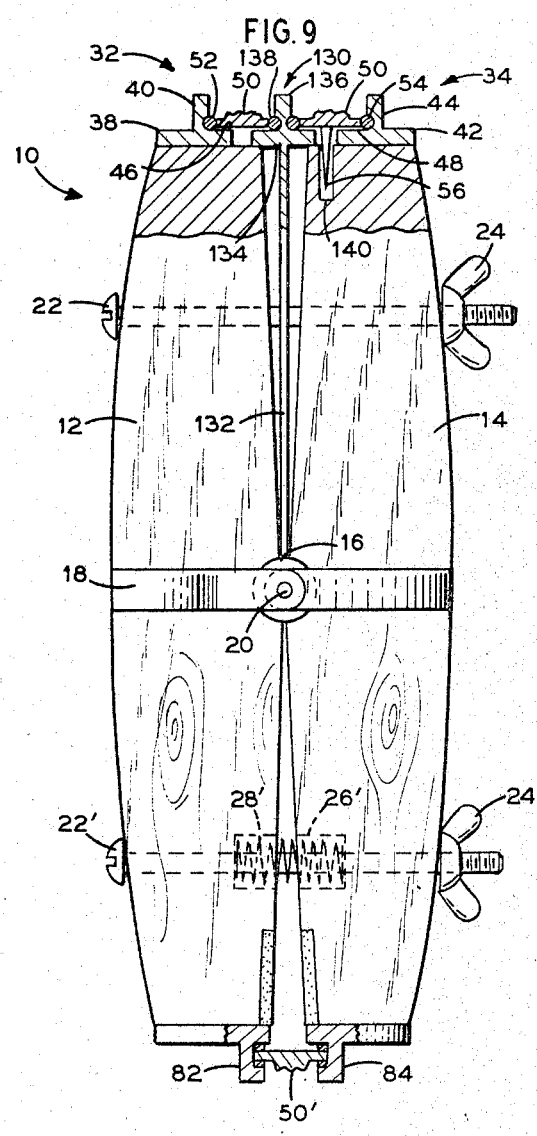
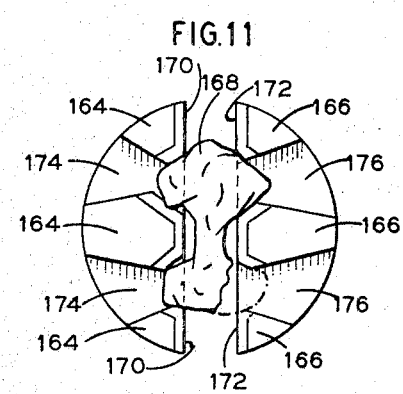
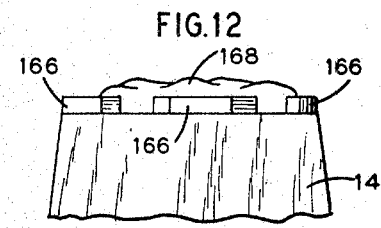

United States Patent Office 3,477,707
Patented Nov. 11, 1969

3,477,707
JEWELER'S VISE
David Pfeffer, 2190 Boston Road,
Bronx, N.Y. 10462
Filed Dec. 6, 1967, Ser. No. 688,571
Int. Cl. B25b *1/10, 1/04, 1/24*
U.S. Cl. 269—219                                6 Claims

ABSTRACT OF THE DISCLOSURE

A jeweler's vise that includes a clamping structure mounted on the jaws thereof for supporting and gripping a plurality of substantially similar sized workpieces therebetween.

BACKGROUND OF THE INVENTION

Field of the invention

This invention relates generally to a jeweler's vise, and more particularly, to a clamping structure having means for supporting and gripping a plurality of substantially similar sized workpieces therebetween.

Description of the prior art

Heretofore, workpiece supporting tools have been proposed which enable a jewelry setter or engraver to perform a selected operation on the supported workpiece. For example, when working on small metal jewelry pieces, it is common for the jeweler to melt shellac chips onto the end of a wooden stick and impress the workpieces partly therein so that they remain firmly in position when the shellac has hardened. After the jeweler performs his work on these pieces, such as setting jewelry stones therein, the shellac is heated and the workpieces are pried loose with a tool. The difficulty and disadvantage in using a shellac stick are that certain workpieces which have been set with soft jewelry stones, such as opals, pearls, garnets and the like, cannot be removed from the stick by heating the shellac since such jewelry stones may crack or become damaged under the application of heat. In such cases, the jeweler or engraver must pry the jewelry pieces loose with a tool while the shellac is cold. It has been found, however, that these workpieces are not pried loose in a sufficiently clean condition, so that the pieces must thereafter be washed or rinsed in a cleaning solution, such as ammonia and warm water. It will be appreciated that the embedding of the jewelry pieces into the shellac and the subsequent cleaning procedure in removing the workpieces therefrom constitute tedious and time consuming operations.

It has further been proposed to utilize a vise apparatus having a fulcrum member and a pair of opposed jaws pivotally mounted thereon, whereby the jaws can be moved in a closing position for gripping a workpiece therebetween. While such a clamping arrangement has proven satisfactory for gripping one workpiece at a time, it has not proven satisfactory or practical for gripping a plurality of workpieces between said jaws. For example, the known clamping arrangements do not provide means for supporting a plurality of workpieces between the jaws prior to closing same. Accordingly, it is extremely difficult, if not impossible, for the jeweler to physically hold more than one workpiece between the jaws while at the same time closing said jaws for engagement with the workpiece. Furthermore, even if a plurality of workpieces could be held between the jaws prior to closing same, it would be necessary for said workpieces to have at least one identical dimension in common with each other so that the jaws could simultaneously firmly grip each and every one of said workpieces therebetween. It will be appreciated, however, that manufacturing tolerances are such that it is extremely unlikely that two or more supposedly similar workpieces will have an identical dimension in common. For example, even if two jewelry workpieces are produced from the same mold or cavity plate, it is common for said workpieces to undergo roughening and polishing operations which result in said workpieces having dissimilar dimensions.

The present invention is an improvement on the above vise apparatus that eliminates the aforesaid difficulties and disadvantages by providing a novel clamping structure mounted on the jaws of the vise. The clamping structure is provided with means for supporting and gripping a plurality of substantially similar sized workpieces therebetween in a manner hereinafter described.

SUMMARY OF THE INVENTION

The jeweler's vise of the present invention includes a pair of clamping units, each having a base portion for mounting said clamping units respectively on the jaws of the vise. Each base portion has an upstanding flange portion recessed from a side edge thereof to define a pair of selves extending outwardly from the respective flange portions in a direction toward one another for supporting a plurality of substantially similar sized workpieces thereon. The opposed sides of the flange portions are provided with yieldable means for gripping engagement with said workpieces when the vise jaws are moved in a closing position; whereby said yieldable means compensate for or take up the difference in lateral dimension of said workpieces so that none of said workpieces will move or fall out of the vise when it is in use.

Accordingly, an object of the present invention is to provide a clamping structure mounted on the jaws of a vise for supporting and gripping a plurality of substantially similar sized workpieces therebetween.

Another object of the present invention is to provide a pair of clamping units mounted respectively on the jaws of a vise, with said clamping units having a configuration for accommodating a portion of the workpiece other than the gripped portion thereof.

A further object of the present invention is to provide a pair of clamping units having opposed portions of irregular contour complementary to the contour of the workpiece gripped therebetween.

Another object and feature of the present invention is to provide a clamping structure for a jeweler's vise that is economical to manufacture and gives long lasting service.

The above and other objects, features and advantages of the present invention will become more apparent from a consideration of the following detailed description when taken in conjunction with the accompanying drawings.

BRIEF DESCRIPTION OF THE DRAWINGS

FIG. 1 is a front elevational view of the jeweler's vise constructed in accordance with the present invention, with parts broken away and parts in section;

FIG. 2 is a top view of the jeweler's vise shown in FIG. 1;

FIG. 3 is a partial front elevational view of the jeweler's vise shown in FIG. 1, with parts in section, illustrating another embodiment of the clamping units;

FIGS. 4 through 8 are front elevational views, with parts in section, illustrating further embodiments of the clamping units of the present invention;

FIG. 9 is a view similar to FIG. 1 showing another embodiment of the present invention;

FIGS. 10 and 11 are top views of still further embodiments of the clamping units, with FIG. 11 having parts broken away; and FIG. 12 is a partial side elevational view of the embodiment shown in FIG. 11.

DESCRIPTION OF THE PREFERRED EMBODIMENT

Referring to the drawings, and more particularly to FIGS. 1 and 2, numeral 10 represents a conventional vise apparatus having a pair of opposed jaws 12 and 14, respectively, for gripping a workpiece therebetween. In this connection, jaws 12, 14 are provided respectively with opposed grooves for receiving fulcrum member 16, and a strap or band 18 is provided which encircles said jaws 12, 14 for pivotally mounting same about fulcrum member 16. Strap 18 is held in position by means of flat head pin 20, the terminal end of which is dirven through strap 18 and anchored in fulcrum member 16. Aligned passageways are further provided adjacent the upper end of jaws 12, 14 for receiving bolt member 22; the end of which is threaded for receiving wing nut 24. Accordingly, it is now apparent that pivotally mounted jaws 12, 14 can be moved towards or away from each other by merely adjusting the position of wing nut 24 on bolt member 22. If desired, the aligned passageways can be provided with enlarged portions 26 on the inner sides of jaws 12, 14 respectively, for receiving coil spring member 28. In this connection, bolt 22 passes axially through spring 28, whereby said spring assists in controlling the movement of the jaws when the wing nut is adjusted. It will be appreciated that other means may be employed for moving the pivotally mounted jaws and that the nut and bolt arrangement is merely shown for illustrative purposes. Accordingly, a wedge member (not shown) may be employed for moving said jaws with the wedge member being frictionally received between the lower opposed sides of jaws 12 and 14.

In accordance with the present invention, a novel clamping structure 30 is mounted on the jaws for supporting and gripipng a plurality of substantially similar sized workpieces therebetween.

Clamping structure 30 comprises a pair of clamping units 32 and 34 mounted respectively on jaws 12 and 14. Each clamping unit is preferably made of metal, such as aluminum, brass or the like, and is mounted on its associated jaw by means of screw 36. Alternatively, clamping units 32, 34 may be mounted on the respective jaws by means of an adhesive cement or other bonding agent. More particularly, clamping unit 32 is formed having a base portion 38 and an upstanding flange portion 40 extending longitudinally thereof. Clamping unit 34 is similarly formed having base portion 42 and upstanding flange portion 44. Accordingly, as shown in FIGS. 1 and 2 base portions 38, 42 of the respective clamping units are mounted on the respective jaws 12, 14 by means of the screws 36, with the flange portion 40, 44 of said clamping units in opposed relation.

In accordance with the present invention, each flange portion 40, 44 is recessed from a side edge of its associated base portion to define a shelf 46 and 48, respectively, extending outwardly therefrom in the direction toward each other for supporting a workpiece 50 thereon. The opposing sides of flange portions 40, 44 are further provided with yieldable means 52 and 54 respectively, for gripping engagement with workpiece 50 when the vise jaws 12, 14 are moved in a closing position. Yieldable means 42, 54 are preferably constructed of a material such as lead, leather, plastic, rubber or the like, and are mounted on the respective flange portions by means of an adhesive cement or other bonding agent. In this connection, yieldable means 52, 54 are each shown as having a circular cross-sectional shape and are received within semi-circular shaped grooves formed in the clamping units at the juncture of the respective flange portions and the outwardly extending shelves. It will now become apparent that the construction of the clamping units 32, 34 is such that the supporting and gripping portions thereof form L-shaped members having horizontal arms in aligned relation that constitute the supporting shelves 46, 48, and vertical arms in opposed relation that constitute the flange portions 40, 44.

will now be appreciated that shelves 46, 48 provide the means for supporting a plurality of similarly sized and spaced workpieces 50 between the jaws prior to closing same. As the jaws are closed by means of wing nut 24, the side edges of each of the workpieces 50 bite into the yieldable means 52, 54 of the respective clamping units 32, 34 whereby said yieldable means 52, 54 compensate for or take up the difference in lateral dimension of the workpieces 50 so that none of said workpieces will move or fall out of the vise when it is in use. Accordingly, the yieldable means 52, 54 enable the clamping units 32, 34 to grippingly engage a plurality of similarly sized workpieces that do not have an identical dimension in common with each other.

The clamping units 32, 34 of the present invention further provide for accommodating a portion of the workpiece 50 other than the gripped portion thereof. Referring to FIG. 1, workpiece 50 is a jewelry pin having a stem portion 56 extending downwardly between the opposed sides of clamping units 32, 34 and between the opposed sides of jaws, 12, 14. If desired, additional yieldable means 58, 60 can be provided on the opposed sides of jaws 12, 14 for accommodating workpieces having depending, laterally projecting portions.

Since the workpieces 50 bite into the yieldable means 52, 54 everytime the vise 10 is in use, it is understood that said yieldable means can be easily replaced with a new supply of same when required.

It is readily apparent that both ends of the jaws 12, 14 can be provided with one of the selective clamping units that come within the purview of the present invention. For example, FIG. 1 illustrates the clamping units of FIG. 5 being mounted on the lower edges of jaws 12, 14. In this connection, flange portions 82 and 84 grip workpiece 50' therebetween when the jaws are closed by adjusting the position of wing nut 24' on bolt member 22'. Enlarged portions 26' and coil spring member 28' correspond to similarly noted members 26 and 28 described above, whereby spring 28' assists in controlling the movement of the lower portion of jaws 12, 14 when wing nut 24' is adjusted.

In FIGS. 3 through 8, there are illustrated other embodiments of the clamping units that may be selectively mounted on the jaws 12, 14 depending on the shape of the workpieces that are to be supported and firmly gripped therebetween. For example, in FIG. 3, the yieldable means 62, 64 are mounted on the opposed sides of flange portions 66, 68 at a position intermediate the respective upper edges thereof and the juncture of said respective flange portions 66, 68 and the outwardly extending shelves 70, 72.

In FIG. 4, only one of the flange portions 74, 76 is provided with yieldable means 78; said yieldable means having a rectangular cross-sectional shape. Furthermore, only one of said flange portions is recessed from the inner side edge of its associated base portion to define the shelf member 80.

In FIG. 5, the upper edges of flange portions 82, 84 are provided with inwardly projecting portions 86, 88 respectively, that define channels for receiving the yieldable means 90, 92.

In FIG. 6, the upper edges of flange portions 94, 96 are provided with inwardly projecting portions 98, 100 respectively, which in turn have downwardly projecting portions 102, 104 that define channels for receiving the yieldable means 106, 108.

In FIG. 7, only one of the flange portions 110, 112 is provided with an inwardly projecting portion 114 that defines a channel for receiving the yieldable means 116.

In FIG. 8, each of the flange portions 118, 120 is provided with yieldable means 122, 124 respectively; said yieldable means having a rectangular cross-sectional shape that extends for the entire height of the respective flange portions.

It will be appreciated that the embodiments shown in FIGS. 3 through 8 are only a few of the many variations that come within the purview of the present invention.

Referring to FIG. 9, there is illustrated a jeweler's vise 10 similar to that shown in FIG. 1. Accordingly, those elements that are common to both figures are indicated with the same numerals for the purpose of clarity. The device of FIG. 9 incorporates an inverted T-shaped member 130 mounted between the clamping units 32, 34 for increasing the number of workpieces that can be supported and gripped therebetween. T-shaped member 130 is provided with a stem portion 132 extending downwardly from the head portion 134 thereof, with the lower end of said stem portion 132 being secured to fulcrum member 16. In this connection, a suitable opening is provided in stem portion 132 for allowing bolt member 22 to pass therethrough. Accordingly, T-shaped member 130 is located with the head portion 134 thereof in aligned relation to the horizontal arms of the clamping units 32, 34; said horizontal arms constituting the shelves 46, 48 as noted above. The arrangement is such that the leg portion 136 of T-shaped member 130 is in opposed relation to the vertical arms of the clamping units 32, 34; said vertical arms constituting the flange portions 40, 44. Yieldable means 138 are further provided on one or both sides of leg portion 136 for gripping engagement with workpieces 50 that are supported between said leg portion 136 and the vertical arms or flange portions 40, 44 when the vise jaws are moved in a closing position. In this connection, the head portion 134 of T-shaped member 130 provides a shelf supporting surface which is in aligned relation to shelves 46, 48. The top portion of jaw 14 can also be provided with a slot or channel 140 extending longitudinally thereof for receiving the stem portion 56 of workpiece 50. It will be appreciated that the leg portion 136 of T-shaped member 130 can be modified in design to incorporate the flange construction embodiments shown in FIGS. 3 through 8.

The clamping units shown in FIGS. 10 and 11 provide additional means for accommodating a portion of the work piece other than the gripped portion thereof. For example, in FIG. 10, flanged portions 150, 152 are provided with yieldable means 154, 156 respectively, for gripping work piece 158 therebetween in the manner heretofore described. However, flange portions 150, 152 are further sloted, as at 160, for accommodating the laterally projecting portions 162 of workpiece 158. In FIG. 11, the flange portions or gripping members are represented by the numerals 164, 166 respectively, which have opposed portions of irregular contour complementary to the contour of the workpiece 168. Yieldable means 170, 172 are provided on the irregular contour opposed portions of gripping members 164, 166, similar to that provided for on the other clamping unit embodiments. As is apparent from the drawing, workpiece 168 is placed on the respective base portions 174, 176 of the clamping units to support same while the jaws are being closed.

While specific embodiments of the invention have been shown and described in detail, it will be readily understood and appreciated that various changes or modifications thereof may be made without departing from the spirit and scope of the invention as set forth in the appended claims.

I claim:

1. In combination with a jeweler's vise having a fulcrum member and a pair of opposed jaws pivotally mounted thereon, and means for moving said jaws in a direction for gripping a workpiece therebetween, wherein the improvement comprises:
   (a) a pair of L-shaped clamping units;
   (b) means mounting the horizontal arms of the clamping units respectively on said jaws in aligned relation to each other with the vertical arms of said clamping units in opposed relation, at least one of said horizontal arms constituting a shelf to support the workpiece thereon;
   (c) an inverted T-shaped member;
   (d) means mounting the T-shaped member with the head portion thereof in aligned relation to the horizontal arms of the clamping units and with the leg portion of said T-shaped member in opposed relation to the vertical arms of said clamping units; and
   (e) yieldable means mounted on said leg portion, whereby said supported workpiece may be gripped between said leg portion and a selected vertical arm when the vise jaws are moved in a closing position.

2. The jeweler's vise as recited in claim 1, wherein the mounting means for said T-shaped member comprises a stem portion extending downwardly from the head portion of said T-shaped member, the lower end of said stem portion being secured to the fulcrum member of the vise.

3. The jeweler's vise as recited in claim 1, further comprising channel forming means on said leg portion for receiving the yieldable means; said yieldable means comprising an elongated strip replaceably disposed in said channel forming means.

4. In combination with a jeweler's vise having a fulcrum member and a pair of opposed jaws pivotally mounted thereon, and means for moving said jaws in a direction for gripping a workpiece therebetween, wherein the improvement comprises:
   (a) a selected pair of clamping units for engaging a workpiece of selected size and configuration;
   (b) each one of said units having a base portion and an upstanding flange portion extending longitudinally thereof:
   (c) means mounting the base portions of the clamping units respectively on said jaws with the flange portions of said clamping units in opposed relation;
   (d) the flange portion of at least one of said clamping units being recessed from a side edge of its associated base portion to define a shelf extending outwardly therefrom in the direction of the other clamping unit to support the workpiece thereon;
   (e) an inverted T-shaped member;
   (f) means mounting said T-shaped member with the head portion thereof in aligned relation to the base portions of said clamping units and with the leg portion of said T-shaped member in opposed relation to the flange portions of said clamping units; and
   (g) yieldable means mounted on at least one side of said leg portion,
whereby said supported workpiece may be gripped between said leg portion and a selected flange portion when the vise jaws are moved in a closing position.

5. In combination with a jeweler's vise having a fulcrum member and a pair of opposed jaws pivotally mounted thereon, and means for moving said jaws in a direction for gripping a workpiece therebetween, wherein the improvement comprises:
   (a) a pair of L-shaped clamping units;
   (b) means mounting the horizontal arms of the clamping units respectively on said jaws in aligned relation to each other with the vertical arms of said clamping units in opposed relation, at least one of said horizontal arms constituting a shelf to support the workpiece thereon;
   (c) an inverted T-shaped member;
   (d) means mounting the T-shaped member with the head portion thereof in aligned relation to the horizontal arms of the clamping units and with the leg portion of said T-shaped member in opposed relation to the vertical arms of said clamping units; and
   (e) yieldable means mounted on at least one of the vertical arms of the clamping units and in opposed relation to the leg portion of said T-shaped member;

whereby said supported workpiece may be gripped between said leg portion and said one of the vertical arms when the vise jaws are moved in a closing position.

6. The jeweler's vise as recited in claim 5, further comprising yieldable means on the leg portion of said T-shaped member and in opposed relation to the yieldable means on said one of the vertical arms of the clamping units.

References Cited

UNITED STATES PATENTS

| | | | |
|---|---|---|---|
| 308,356 | 11/1884 | Goodrich | 269—238 |
| 549,354 | 11/1895 | Gallup | 269—238 X |
| 941,832 | 11/1909 | Widmann | 269—258 X |
| 1,890,114 | 12/1932 | Fulton | 269—265 X |
| 1,574,585 | 2/1926 | Linnig | 269—279 X |
| 2,612,735 | 10/1952 | Lea | 269—282 X |

ROBERT C. RIORDON, Primary Examiner

D. R. MELTON, Assistant Examiner

U.S. Cl. X.R.

269—237, 275, 282